Patented July 26, 1949

2,477,553

UNITED STATES PATENT OFFICE 2,477,553

USE OF A PROMOTER IN THE MANUFACTURE OF COBALT CARBONYL

Charles H. McKeever, Glenside, Pa., assignor to Rohm & Haas Company, Philadelphia, Pa., a corporation of Delaware No Drawing. Application November 22, 1947, Serial No. 787,616

7 Claims. (Cl. 23—203)

This invention relates to new and useful improvements in the manufacture of cobalt carbonyl. More specifically, it relates to a process wherein cobalt carbonate, hydroxide, or basic carbonate is suspended in a neutral organic liquid containing a small amount of pre-formed cobalt carbonyl and is reacted therein with carbon monoxide under pressure and heat to form additional cobalt carbonyl.

It has been known heretofore to prepare cobalt tetracarbonyl by the reaction of cobalt metal and carbon monoxide. Such a process, however, requires the preparation of cobalt metal in a finely divided, activated form and yields the carbonyl in the solid form, which is relatively unstable and difficult to handle or transport. In another application, Serial No. 787,615, filed of even date, I have disclosed an improved process for the production of cobalt carbonyl which comprises suspending a cobalt compound from the group consisting of cobalt carbonate, cobalt basic carbonate, and cobalt hydroxide or mixtures thereof in a neutral organic liquid and reacting said suspended cobalt compound with carbon monoxide at temperatures above about 140° C. under superatmospheric pressure. In that process, considerable time elapses before the rate of reaction between the cobalt compound and the carbon monoxide is high, and this period is known as the "induction period."

It has now been found that the above-described process can be improved and that the induction period can be greatly reduced by the use of a promoter or catalyst, which causes the carbon monoxide and cobalt compound to react extremely rapidly. The promoter which has been found to be most suitable for this purpose is pre-formed cobalt carbonyl, and it is preferably dissolved in the neutral organic liquid in which the cobalt carbonate, hydroxide, or basic carbonate is suspended. Only small amounts of the carbonyl are required; and it has been found that as little as 1% of cobalt carbonyl, based on the cobalt carbonate, hydroxide, or basic carbonate, so accelerates the rate of reaction of said cobalt compound with carbon monoxide that the induction period is essentially eliminated. For example, in a batch process, the total time required for the conversion of the original cobalt compound to the carbonyl may be reduced from two hours to fifteen minutes when 1% of pre-formed cobalt carbonyl is present as promoter. A minimum amount of cobalt carbonyl equal to 0.25% of the weight of the initial cobalt compound is required. The maximum amount is not critical, since the process is one of producing more cobalt carbonyl. Actually, there is no advantage in employing more than 10% of promoter on the same basis, and an upper limit of 6% is preferred for reasons of economy.

The suspension of cobalt compound is prepared by merely mixing the organic liquid with one of the designated cobalt compounds or with a mixture of any two or all three of said compounds in a finely divided form. These three materials, which, when employed individually or as mixtures with one another, will be referred to as "initial cobalt compound" for the sake of convenience, may also be carried or precipitated on finely divided silicious materials in order to provide a larger surface for reaction with the carbon monoxide. Suitable extenders or carriers include infusorial or diatomaceous earth, activated carbon, neutral clays, and the like.

The cobalt carbonyl is dissolved in the suspending liquid at any stage. It may be added as cobalt carbonyl per se or in the form of a solution. A portion of one batch of carbonyl solution may be added as promoter to subsequent batches; or, if the same equipment is used, some of each batch of product may merely be left in the equipment to catalyze the next batch. In a continuous process, a small portion may be bled into the stream of reactants.

The suspension of cobalt compound in the organic liquid is then charged to a reaction vessel and reacted therein with carbon monoxide at elevated temperatures and superatmospheric pressures in the presence of the small amount of promoter. While the process is independent of details in equipment, it has been found that fast and high conversion of the initial cobalt compound to cobalt carbonyl is effected when the reaction is carried out in a shaking bomb or autoclave charged with the suspended initial cobalt compound and carbon monoxide under pressure. The course of the reaction can be followed readily, in this case, by the fall in pressure as the carbon monoxide reacts to form the carbonyl. Alternatively, this invention may be carried out continuously, for example, by dropping or spraying the liquid suspension of initial cobalt compound and promoter into a reaction vessel while carbon monoxide is also admitted continuously. A very convenient process involves spraying the suspension into a pressure chamber while carbon monoxide is passed through the suspension countercurrently. In such a case, compressed carbon monoxide may also be used to spray the suspension of cobalt compound and promoter.

While pure carbon monoxide may be employed, it is much preferred that it be diluted with hydrogen. The presence of hydrogen not only accelerates the rate at which cobalt carbonyl is produced but it also makes for a higher yield of the latter. The ratio of carbon monoxide and hydrogen may be widely varied, and amounts of hydrogen from one quarter to four times the amount of carbon monoxide may be used, although it is preferred to use more practical amounts for the sake of efficiency. Such amounts of hydrogen are from one half to two times the amount of carbon monoxide.

A wide variety of organic liquids can be employed for suspending the initial cobalt compound, although, as might be expected, some operate more efficiently than others. The prime requirements of the organic liquid are that it be neutral and that it be also a solvent for cobalt carbonyl, since one of the objects of this invention is to prepare a solution of cobalt carbonyl which can be utilized to better advantage than the solid carbonyl formed by other processes. Inert organic liquids which are capable of dissolving as much as 5% to 15% of cobalt carbonyl are especially recommended as being suitable. The word "inert" is used in the accepted and recognized sense to indicate that the liquid does not undergo chemical reaction with the reactants employed to produce the cobalt carbonyl or with the cobalt carbonyl itself. While liquids having aliphatic unsaturation are normally avoided because they may react with carbon monoxide in the presence of hydrogen and the formed cobalt carbonyl to produce aldehydes and are, therefore, not inert in the accepted sense, they nevertheless may be employed. In such an instance, some carbon monoxide and hydrogen are consumed in converting the unsaturated liquid to an aldehyde, and the remainder or additional carbon monoxide reacts to form cobalt carbonyl which dissolves in the mixture of aldehyde and unsaturated liquid. The liquid must also be neutral, i. e., neither acidic nor basic; and, therefore, compounds containing carboxyl or amino groups are excluded. Amides, however, such as propionamide, being neutral, are not excluded. Suitable inert neutral liquids may be exemplified by the following: Ketones, such as acetone, diethyl ketone, methyl ethyl ketone, methyl hexyl ketone, diisopropyl ketone, methyl isobutyl ketone, acetophenone, diphenyl ketone; alcohols, such as methyl, ethyl, isopropyl, isobutyl, tertiary butyl, isononyl, isoheptyl, benzyl, and dodecyl alcohols; esters, such as ethyl acetate, isobutyl acetate, tertiary amyl propionate, methyl formate, benzyl acetate, and isobutyl benzoate; ethers, such as diethyl ether, dibutyl ether, diisopropyl ether, dioxan, and diphenyl ether; hydrocarbons, such as isooctane, heptane, cyclohexane, methylcyclohexane, toluene, and benzene; aldehydes, such as heptaldehyde, butyraldehyde, propionaldehyde, isobutyraldehyde, isoamylaldehyde, laurylaldehyde, isononylaldehyde, and benzaldehyde; and other inert organic liquids, such as acetonitrile, ethylene dichloride, and chlorobenzene. Saturated hydrocarbons are ideal liquids from the standpoint of inertness, neutrality, and availability but do not hold so much cobalt carbonyl in solution as those liquids listed above. Ketones and ethers are the solvents of first choice while esters and alcohols are next preferred, and aldehydes, amides, and nitriles form a third class in order of preference.

The ratio of organic liquid to initial cobalt compound can be varied widely within reasonable limits. Sufficient liquid should be used to provide a fluid suspension of the cobalt compound, but amounts above fifteen times the weight of the initial cobalt compound do not appear to be justified. In fact, an amount of liquid equal to ten to twelve times the weight of the initial cobalt compound is preferred and recommended. As the carbonyl compound is formed, it dissolves in the liquid; and it has been found that the rate of formation of the carbonyl becomes definitely slower as the amount of cobalt carbonyl dissolved in the liquid approaches the saturation point. It may be said that the best yields of carbonyl are obtained in liquids which are the best solvents therefor, all other factors being constant, and that lower yields are obtained in poorer solvents. Furthermore, solutions containing 8% to 12% of cobalt carbonyl can be handled readily; and, accordingly, it is preferred to employ such amounts of inert organic liquid as will yield such solutions.

It is well known that cobalt carbonyl can be prepared from carbon monoxide and activated cobalt metal over a wide range of temperature and pressure. The same conditions can be employed in the process of this invention, but one of the advantages of this process is that cobalt carbonyl can be prepared rapidly at much lower temperatures than those employed heretofore successfully. The reaction, in the presence of the promoter, will proceed at temperatures as low as 80° C. and, of course, will take place at much higher temperatures also. Regarding the upper limit of temperature, it can be said that temperatures ranging from 80° C. to 400° C. have been studied, and it is evident that very little, if anything, is to be gained by operating above 300° C. In fact, the preferred range, from the standpoint of efficiency in batch operation, is from 80° C. to 150° C. while, in continuous operation, a top temperature of 300° C. is adequate and preferred. This is apparent, for example, from a consideration of two parallel experiments in which cobalt carbonate suspended in diisopropyl ether and catalyzed by 4% of cobalt carbonyl was converted to approximately the same high yield in ten minutes at 110° C. as in one hour at 150° C.

In addition to the fact that this process utilizes cobalt compounds of low cost rather than specially prepared cobalt metal, the particular advantage of this process is the speed of reaction and the high yield of cobalt carbonyl.

Following is an example which serves to illustrate this invention:

Into a shaking bomb were charged two hundred cc. of methyl ethyl ketone, ten cc. of a 6% solution of cobalt carbonyl in methyl ethyl ketone, and fourteen grams of cobalt carbonate precipitated on six grams of diatomaceous earth. The bomb was flushed with carbon monoxide and then charged to 2600 pounds of pressure with a mixture of equal parts of carbon monoxide and hydrogen. Shaking and heating were started, and, by the time the temperature had reached 110° C., the reaction, as evidenced by a fall in pressure, was proceeding rapidly. The temperature was maintained at 110°–120° C. for ten minutes. The bomb and contents were then cooled to 20° C., the bomb was vented, and the liquid was decanted. The product was a dark brown, clear liquid containing 10.2% of cobalt carbonyl.

In similar manner, solutions of cobalt carbonyl were prepared in the presence of the promoter from cobalt hydroxide suspended in isooctane and cobalt basic carbonate suspended in methyl ethyl ketone.

I claim:

1. In the process of preparing cobalt carbonyl by suspending a finely divided cobalt compound from the group consisting of cobalt carbonate, cobalt basic carbonate, and cobalt hydroxide in a neutral organic liquid which is a solvent for cobalt carbonyl and reacting said cobalt compound with carbon monoxide at a temperature from 80° C. to 300° C. and under superatmospheric pressure, the improvement which comprises having initially present in the reactor before any reaction takes place from 0.25% to 10% of pre-formed cobalt carbonyl based on the weight of said cobalt compound.

2. In the process of preparing cobalt carbonyl by suspending a finely divided cobalt compound from the group consisting of cobalt carbonate, cobalt basic carbonate, and cobalt hydroxide in a neutral inert organic liquid which is a solvent for cobalt carbonyl and reacting said cobalt compound with carbon monoxide at a temperature from 80° C. to 150° C. and under a pressure of 500 to 5000 pounds per square inch, the improvement which comprises having initially present in the reactor before any reaction takes place from 0.25% to 6% of pre-formed cobalt carbonyl based on the weight of said cobalt compound.

3. In the process of preparing cobalt carbonyl by suspending a finely divided cobalt compound from the group consisting of cobalt carbonate, cobalt basic carbonate, and cobalt hydroxide in a neutral organic liquid which is a solvent for cobalt carbonyl and reacting said cobalt compound with carbon monoxide in the presence of hydrogen in an amount from one-quarter to four times the amount of carbon monoxide at a temperature of 80° C. to 300° C. and under superatmospheric pressure, the improvement which comprises having initially present in the reactor before any reaction takes place 0.25% to 10% of pre-formed cobalt carbonyl based on the weight of said cobalt compound.

4. In the process of preparing cobalt carbonyl by suspending a finely divided cobalt compound from the group consisting of cobalt carbonate, cobalt basic carbonate, and cobalt hydroxide in a neutral organic liquid which is a solvent for cobalt carbonyl and reacting said cobalt compound with carbon monoxide in the presence of hydrogen in an amount from one half to two times the amount of carbon monoxide at a temperature of 80° C. to 300° C. and under a pressure of 500 to 5000 pounds per square inch, the improvement which comprises having initially present in the reactor before any reaction takes place 0.25% to 6.0% of pre-formed cobalt carbonyl based on the weight of said cobalt compound.

5. In the process of preparing cobalt carbonyl by suspending finely divided cobalt carbonate in a neutral organic liquid which is a solvent for cobalt carbonyl and reacting said cobalt carbonate with carbon monoxide at a temperature from 80° C. to 150° C. under a pressure of 500 to 5000 pounds per square inch, the improvement which comprises having initially present in the reactor before any reaction takes place from 0.25% to 6.0% of pre-formed cobalt carbonyl based on the weight of said cobalt carbonate.

6. In the process of preparing cobalt carbonyl by suspending finely divided cobalt hydroxide in a neutral organic liquid which is a solvent for cobalt carbonyl and reacting said cobalt hydroxide with carbon monoxide at a temperature from 80° C. to 150° C. under a pressure of 500 to 5000 pounds per square inch, the improvement which comprises having initially present in the reactor before any reaction takes place from 0.25% to 6.0% of pre-formed cobalt carbonyl based on the weight of said cobalt hydroxide.

7. In the process of preparing cobalt carbonyl by suspending finely divided cobalt basic carbonate in a neutral organic liquid which is a solvent for cobalt carbonyl and reacting said cobalt basic carbonate with carbon monoxide at a temperature from 80° C. to 150° C. under a pressure of 500 to 5000 pounds per square inch, the improvement which comprises having initially present in the reactor before any reaction takes place from 0.25% to 6.0% of pre-formed cobalt carbonyl based on the weight of said cobalt basic carbonate.

CHARLES H. McKEEVER.

No references cited.